(12) United States Patent
Beaulieu et al.

(10) Patent No.: US 7,906,097 B2
(45) Date of Patent: *Mar. 15, 2011

(54) PROCESSES FOR TREATING ALUMINIUM DROSS RESIDUES

(75) Inventors: Martin Beaulieu, Ste-Foy (CA); Stéphane Chabot, Lévis (CA); Yves Charest, Ancienne-Lorette (CA); Jean-François Savard, Ste-Foy (CA)

(73) Assignee: Groupe Conseil Procd Inc., Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/941,575

(22) Filed: Nov. 16, 2007

(65) Prior Publication Data

US 2009/0022640 A1 Jan. 22, 2009

Related U.S. Application Data

(60) Provisional application No. 60/949,948, filed on Jul. 16, 2007.

(51) Int. Cl.
*C01F 7/56* (2006.01)
*C01F 7/30* (2006.01)
*C22B 21/00* (2006.01)

(52) U.S. Cl. ........ 423/625; 423/122; 423/132; 423/495; 423/626; 423/629

(58) Field of Classification Search .......... 423/122, 423/126, 132, 495, 625, 626, 629
See application file for complete search history.

(56) References Cited

U.S. PATENT DOCUMENTS

| | | | |
|---|---|---|---|
| 0,752,927 A | 2/1904 | Schwahn | |
| 1,519,880 A | 12/1924 | Specketer et al. | |
| 1,646,732 A | 10/1927 | Lea et al. | |
| 1,752,599 A | 4/1930 | Kjellgren | |
| 1,868,499 A | 7/1932 | Guertler | |
| 2,217,099 A | 10/1940 | Burman | |
| 2,413,709 A | 1/1947 | Hoffman | |
| 3,169,827 A | 2/1965 | de Rosset et al. | |
| 3,620,671 A * | 11/1971 | Pierre Maurel et al. | 423/128 |
| 4,039,726 A | 8/1977 | Carr et al. | |
| 4,224,287 A | 9/1980 | Ziegenbalg et al. | |
| 4,252,777 A * | 2/1981 | McDowell et al. | 423/111 |
| 4,320,098 A * | 3/1982 | Huckabay et al. | 423/132 |
| 4,348,366 A | 9/1982 | Brown et al. | |
| 4,428,912 A | 1/1984 | Reynolds et al. | |
| 4,959,100 A | 9/1990 | Dubéet al. | |
| 4,960,460 A | 10/1990 | Dubéet al. | |
| 5,102,453 A | 4/1992 | Yerushalmi | |
| 5,407,459 A | 4/1995 | Breault et al. | |
| 5,585,080 A | 12/1996 | Andersen et al. | |
| 5,613,996 A | 3/1997 | Lindsay | |
| 5,716,426 A | 2/1998 | Beelen et al. | |
| 6,110,434 A | 8/2000 | Pickens et al. | |
| 2004/0259718 A1 * | 12/2004 | Feige et al. | 501/127 |

* cited by examiner

*Primary Examiner* — Ngoc-Yen M Nguyen
(74) *Attorney, Agent, or Firm* — Bereskin & Parr LLP/S.E.N.C.R.L., s.r.l.

(57) ABSTRACT

There is provided a process for preparing aluminium chloride comprising leaching aluminium dross residues with $H_2SO_4$ so as to obtain a leachate; and hydrochlorinating the leachate so as to obtain aluminium chloride. If desired, aluminium chloride can then be converted into alumina.

28 Claims, 2 Drawing Sheets

US 7,906,097 B2

PROCESSES FOR TREATING ALUMINIUM DROSS RESIDUES

CROSS-REFERENCE TO RELATED APPLICATION

The present application claims priority on U.S. provisional application No. 60/949,948 filed on Jul. 16, 2007 which is incorporated herein by reference in its entirety.

TECHNICAL FIELD

The present invention relates to improvements in the field of inorganic chemistry applied to aluminium dross residues. In particular, this invention relates to processes for treating aluminium dross residues.

BACKGROUND OF THE INVENTION

In the production of aluminium (aluminium smelters) or melting of aluminium (eg. for manufacture of extrusions, ingots and billets) a by-product called aluminium dross is formed. Such a by-product is formed in molten aluminium in view of oxygen from environmental air as well as impurities present in aluminium. Aluminium dross generally comprises free metal and non-metallic substances (e.g. aluminium oxide and salts). Aluminium nitrides and carbides may also be present, as well as metals oxides derived from molten alloy. Aluminium dross does represent an interesting by-product to valorize in order to recuperate or recover the products contained therein.

It is known to process the dross first by separating aluminium from it to obtain aluminium dross residues, which are also known as non-metallic products (NMP). In other words it can be said that the aluminium dross residues are obtained by at least partially removing aluminium metallic from aluminium dross. Aluminium dross is normally treated either by a plasma or in a conventional furnace with a salt mixture, to remove recoverable aluminum metal, leaving a dross residue having reduced aluminum content.

The main components in aluminium dross residues generally include alumina, aluminum metallic and spinel. Other main components such as aluminum nitride, gibbsite ($Al(OH)_3$), and diaoyudaoite ($NaAl_{11}O_{17}$) can also be present. Various minor components such as $Fe_2O_3$, $SiO_2$, $MgO$ can also be present.

Dube et al. in U.S. Pat. Nos. 4,959,100 and 4,960,460 disclose treatment processes for recovering aluminum from aluminum dross hence producing aluminum dross residues. Such aluminium dross residues are also disclosed in U.S. Pat. No. 5,407,459, and known as NOVAL™.

Formerly aluminium dross residues originating from known dross processing techniques in rotating salt furnaces were put in a landfill as waste. Such disposal is increasingly facing environmental problems or is even banned, since salts can leach from the aluminium dross residues and pass into the soil below. Aluminum dross residues are frequently classified as hazardous material. Therefore, the disposal, transformation or valorization of the aluminium dross residues is of prime economic and environmental importance.

Several solutions have been proposed for recuperating aluminium from aluminium dross but only few have been proposed for valorizing or treating aluminium dross residues i.e. residues that are obtained after removal of aluminium from aluminium dross.

It would thus be highly desirable to be provided with a process that would propose an alternative way for valorizing aluminium dross residues into a product, which is different than calcium aluminates.

SUMMARY OF THE INVENTION

According to one aspect of the invention, there is provided a process for preparing aluminium chloride comprising:
  leaching aluminium dross residues with $H_2SO_4$ so as to obtain a leachate; and
  hydrochlorinating the leachate so as to obtain aluminium chloride.

According to another aspect of the invention, there is provided a process for preparing aluminium chloride comprising:
  treating aluminium dross residues so as to reduce the amount of aluminium nitride present therein;
  leaching the aluminium dross residues with $H_2SO_4$ so as to obtain a leachate; and
  hydrochlorinating the leachate so as to obtain aluminium chloride.

According to another aspect of the invention, there is provided a process for preparing alumina comprising:
  optionally treating aluminium dross residues so as to reduce the amount of aluminium nitride present therein;
  leaching the aluminium dross residues with $H_2SO_4$ so as to obtain a leachate;
  hydrochlorinating the leachate so as to obtain aluminium chloride; and
  converting aluminium chloride into alumina.

The expression "aluminium dross residues" as used herein refers to residues that are obtained by substantially removing the recoverable aluminum metal from aluminium dross. For example, the aluminium dross residues comprise alumina, aluminium metal and spinel ($MgAl_2O_4$). Some other compounds such as aluminum nitride, gibbsite ($Al(OH)_3$), and diaoyudaoite ($NaAl_{11}O_{17}$) can also be present at various proportions. Various minor components such as $Fe_2O_3$, $SiO_2$, $MgO$ can also be present. For example, the dross residues can comprise NOVAL™, SEROX™, or a mixture thereof.

The term "SEROX™" as used herein refers, for example, to aluminium dross residues that comprise alumina, aluminium metal, spinel ($MgAl_2O_4$), and gibbsite ($Al(OH)_3$). Such residues can also comprises various other compounds, such as diaoyudaoite ($NaAl_{11}O_{17}$), sylvite (KCl), Halite (NaCl), Cryolite ($Na_3AlF_6$), mica, sodalite ($Na_4Al_3Si_3O_{12}Cl$), $Ca_2SiO_4$, albite ($NaAlSi_3O_8$), fluorite $CaF_2$, or mixtures thereof.

The term "NOVAL™" as used herein refers, for example, to aluminium dross residues that comprise alumina, aluminium, aluminium nitride, sodium oxide and magnesium oxide.

The amount of aluminium nitride present in the aluminium dross residues can be reduced by converting aluminium nitride into aluminium hydroxide. For example, at least 80%, at least 85%, at least 90%, or at least 95% of the aluminium nitride present in the aluminium dross residues can be converted into aluminium hydroxide. Aluminium nitride can be converted into aluminium hydroxide by reacting the aluminium dross residues with water having a temperature of at least 80° C., at least 85° C., at least 90° C., or at least 95° C. For example, the water temperature can be around its boiling point. A solid can be recovered after the conversion of aluminium nitride into aluminium hydroxide and the solid can be treated (for example leached with $H_2SO_4$) so as to solubilize at least a portion of the aluminium hydroxide, thereby obtaining a leachate and another solid. The solid can be treated with a solution comprising $H_2SO_4$. The solution can further comprise aluminium sulfate. The other solid can also be leached with $H_2SO_4$ so as to obtain a leachate.

In the processes of the present invention, the leaching can be carried out at a temperature of at least 70° C., at least 90° C., at least 125° C., at least 150° C., at least 160° C., at least 200° C., at least 225° C., or at least 250° C.

For example, after the leaching step, a mixture comprising a solid phase and a liquid phase can be obtained. These two phases can eventually be separated. They can be separated by various means including membranes, filtration means, for example under vacuum etc. The solid phase can be treated with water having a temperature of at least 30° C. so as to solubilize metals and minerals contained therein and to obtain the leachate.

For example, the solid phase can be treated with water having a temperature of at least 50° C. or of at least 70° C. so as to solubilize metals and minerals contained therein and to obtain the leachate. The leachate can be hydrochlorinated with gaseous HCl.

Hydrochlorination can be carried out at a temperature of about −10° C. to about 20° C. or at a temperature of about −10° C. to about 0° C. The leachate can be hydrochlorinated with gaseous HCl.

Aluminium chloride can optionally be converted into alumina. The conversion of aluminium chloride into alumina can be, for example, carried out by pyrolizing or pyrohydrolizing the aluminium chloride so as to obtain alumina. Such a step can be, for example, carried out at a temperature of about 100° C. to about 1400° C., about 200° C. to about 1300° C., about 800° C. to 1200° C., or at about 950° C. to 1150° C. This step can be, for example, carried out over a period of about 0.5 to about 6 hours, about 1 hour to about 3 hours, or over a period of about 1.5 hours. For example, aluminium chloride can be converted into aluminium hydroxide by heating aluminium chloride at a temperature of at least 100° C., at least 200° C., at least 300° C., at least 400° C., at least 500° C., at least 600° C., at least 700° C., at least 800° C., at least 900° C., or at least 950° C. Then, aluminium hydroxide can be converted into alumina by heating aluminium hydroxide at a temperature of at least 450° C., at least 550° C., at least 650° C., at least 750° C., at least 850° C., at least 950° C., or at least 1000° C. Conversion of aluminium chloride into alumina can further comprise washing the aluminium hydroxide so as to remove chloride salts.

For example, in a process of the present invention used for preparing alumina (see the conversion from aluminium chloride to alumina in the previous paragraph), at least 50%, at least 60%, at least 70%, at least 80%, at least 90%, at least 95%, or at least 99% by weight of the Al atoms contained in the aluminium dross residues can be obtained in the form of alumina. About 80% to about 95% by weight of the Al atoms contained in the aluminium dross residues can be obtained in the form of alumina. The alumina so-obtained can have a purity of at least 80%, at least 85%, at least 90%, at least 93%, at least 95%, at least 98%, at least 99%, or of about 93% to about 99%.

The leaching step can be carried out using a $H_2SO_4$ solution having a concentration of about 50% to about 98%, about 70% to about 98%, or of about 98%.

BRIEF DESCRIPTION OF DRAWINGS

In the following drawings, which represent by way of example only, various embodiments of the invention.

DETAILED DESCRIPTION OF THE INVENTION

Further features and advantages of the invention will become more readily apparent from the following description of various embodiments as illustrated by way of non-limiting examples in the appended drawings.

Example 1

Figure 1:
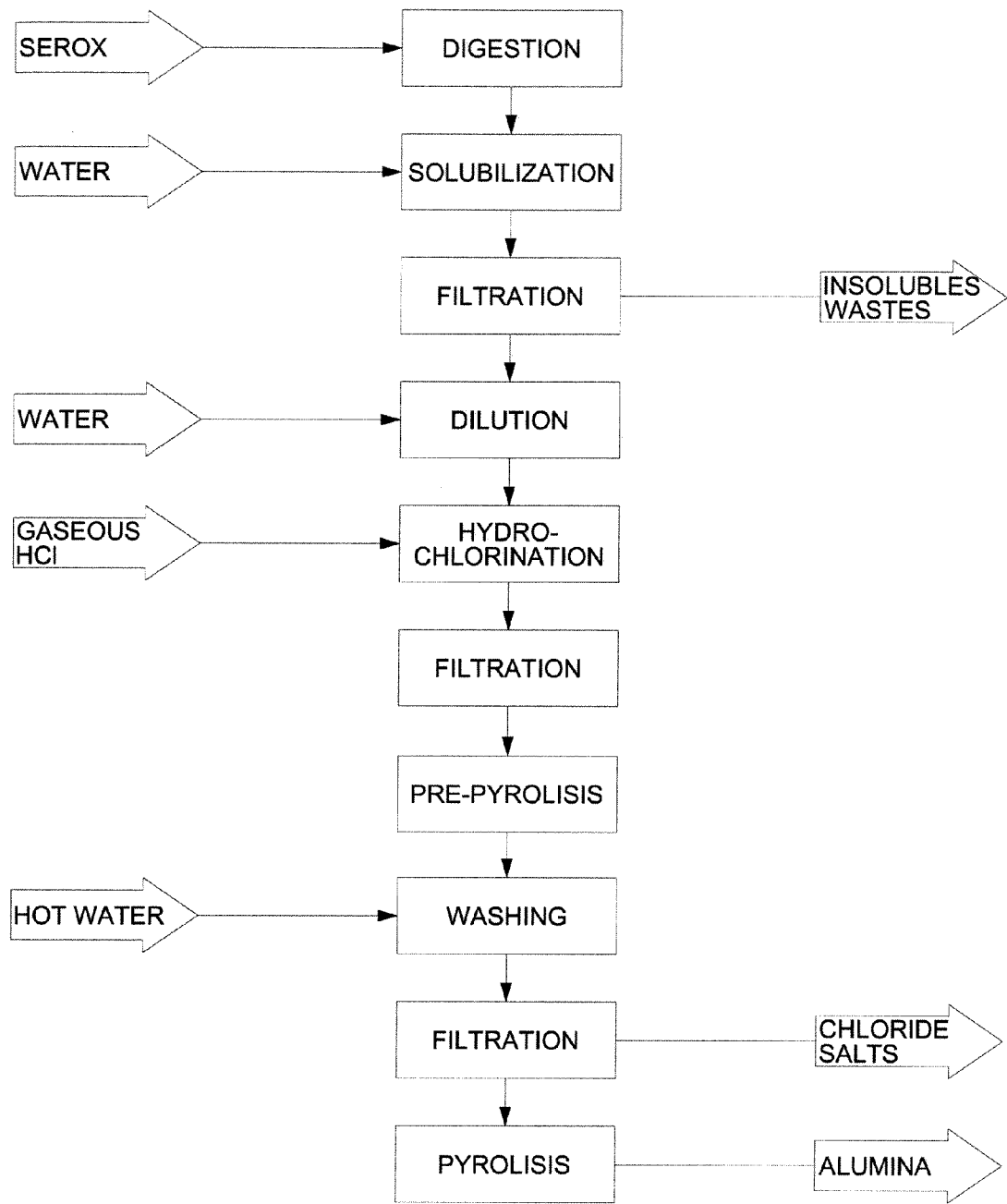
FIG. 1 shows a bloc diagram of a process according to one embodiment of the present invention.

The following example (see FIG. 1) was carried out on aluminium dross residues, and more particularly on SEROX™. The SEROX sample contained the following components: 32.4% of alumina, 1.0% of aluminium metal, 7.0% of gibbsite ($Al(OH)_3$), 20.0% of diaoyudaoite ($NaAl_{11}O_{17}$), 0.5% of sylvite (KCl), 2.5% of halite (NaCl), 2.0% of cryolite ($Na_3AlF_6$), 3.1% of mica, 0.5% of sodalite ($Na_4Al_3Si_3O_{12}Cl$), 2.5% of $Ca_2SiO_4$, 1.8% of albite ($NaAlSi_3O_8$), 1.0% of fluorite $CaF_2$ and humidity. It was calculated that the theoretical yield of 100% conversion of all the Al atoms contained in the dross residues into alumina would provide an amount of 24.9 g of alumina.

The process can comprise different amounts of steps and, in accordance with the steps carried out, different final products (aluminium chloride or alumina) will be obtained and the percentage of Al atoms recovered from the aluminium dross residues will also vary. As previously indicated, each process or treatment comprises at least one $H_2SO_4$ leaching step and one hydrochlorinating step. Optionally a conversion from aluminium chloride to alumina can be carried out when the desired final product is alumina.

$H_2SO_4$ Leaching Step

In the $H_2SO_4$ leaching step (or digestion), the aluminium dross residues were mixed with $H_2SO_4$ 98% at a temperature of about 275° C. under constant stirring for a period of about 8 hours. About 800.0 g of SEROX were introduced in a reactor with 8 liters of $H_2SO_4$ 98% and the mixture was kept under stirring at the aforesaid temperature. When the reaction was completed, the heating was stopped and the mixture was stirred until a temperature of about 70° C. was obtained. Then, the mixture was filtered under vacuum and about 5.4 liters of and aqueous phase (unreacted $H_2SO_4$) and a solid (for example a paste) containing residues ($H_2SO_4$, minerals and metals (such as sulfates)) were recovered.

The paste was then mixed with about 13 liters of hot water and the so-obtained mixture was stirred and maintained at a temperature of about 80° C. in order to solubilize the metals and minerals contained therein. Then, the hot mixture was filtered under vacuum to obtain a leachate of a volume of about 13 liters and a solid residue of about 26 grams on a dry basis.

Hydrochlorination Step

The leachate (about 13 liters) was cooled at −10° C. Then, it was treated with gaseous HCl and the reaction was carried out at a temperature of about −4° C. to about −10° C. The hydrochlorination was carried out until saturation of the solution. The gaseous HCl thereby introduced caused aluminium chloride to precipitate. Then, the so-obtained cold mixture was filtered under vacuum so as to provide about 2735 grams of aluminium chloride hydrate and about 12 liters of a waste liquid.

Pyrohydrolysis of Aluminium Chloride into Alumina

The aluminium chloride so-obtained can then optionally be converted into alumina by means of a pyrohydrolysis.

The aluminium chloride was heated (pre-pyrolysis) at a temperature of about 500° C. for a period of about 2 hours in order to convert the aluminium chloride into aluminium hydroxide and gaseous HCl. Then, the so-obtained material was washed with hot water at about 80° C. to remove chloride salts. The product was then heated for 15 minutes at about 1050° C. to convert aluminium hydroxide into gamma-alumina, thereby providing about 481 g of alumina having a degree of purity of at least 98%. The 100% theoretical yield of conversion of all the Al atoms contained in the SEROX should provide 544 g of alumina. Therefore, the yield for recovering the Al atoms of the dross residues into alumina was 88.4%.

Example 2

Figure 2:
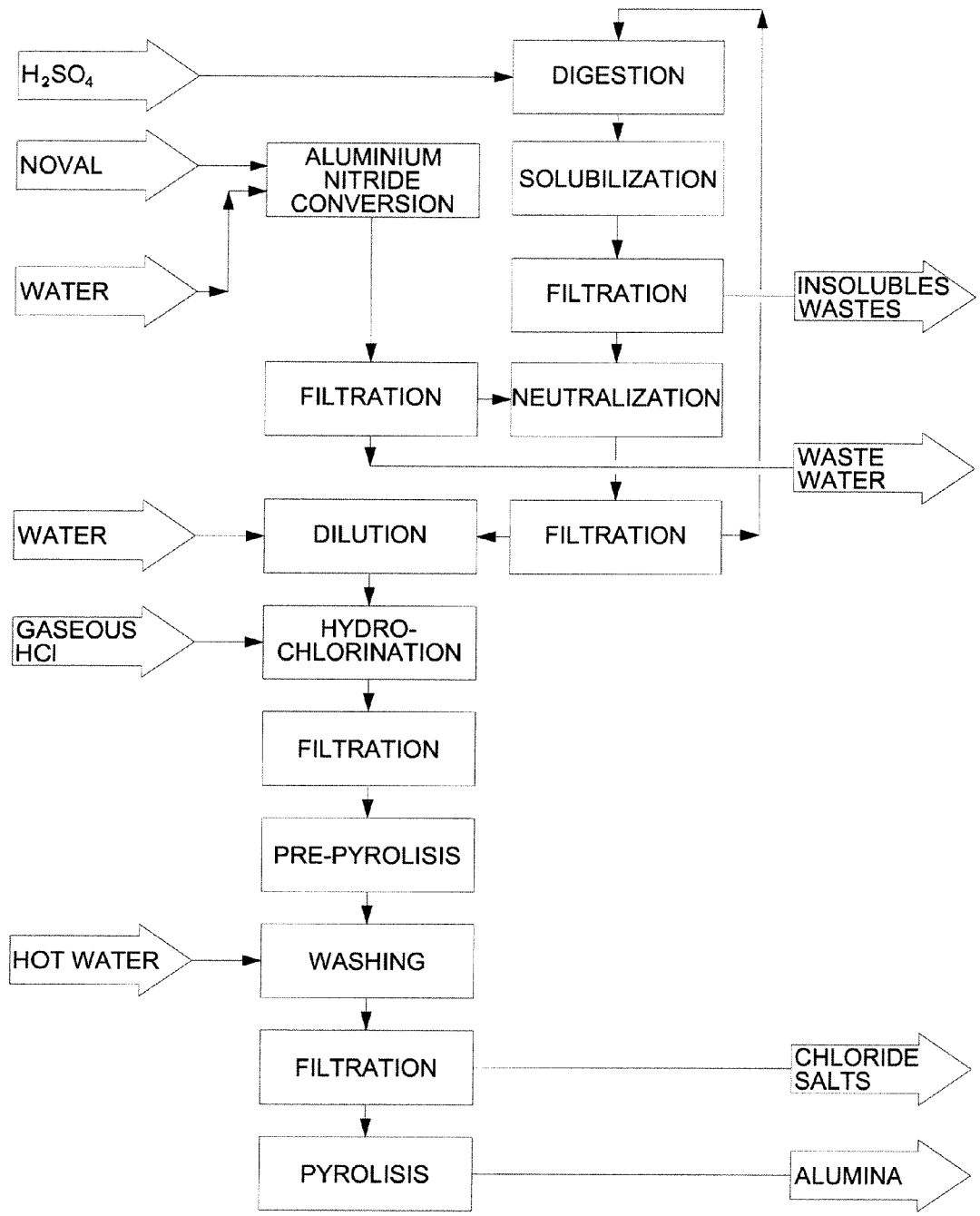
FIG. 2 shows a bloc diagram of a process according to another embodiment of the present invention.

The following example (see FIG. 2) was carried out on aluminium dross residues containing at least 15% of aluminium nitride and more particularly on NOVAL™. The NOVAL sample contained the following components: 52% of alumina ($Al_2O_3$), 42% of sodium oxide ($Na_2O$), 3% of silica ($SiO_2$), 9% of magnesium oxide (MgO), 20% of aluminium nitride (AlN), 12% of aluminium metal, 1.7% of calcium fluoride ($CAF_2$), 1.4% % of chloride expressed as sodium chloride, 4% of total fluoride, 0.7% of ferric oxide ($Fe_2O_3$) and 0.4% of manganese oxide (MnO). It was calculated that the theoretical yield of 100% conversion of all the Al atoms contained in this dross residues into alumina would provide an amount of about 1 kg of alumina per kg of dross residues.

The process can comprise various amounts of steps and, in accordance with the steps carried out, different final products (aluminium chloride or alumina) will be obtained. As previously indicated, each process or treatment comprises at least one conversion of aluminium nitride into aluminium hydroxide step, one neutralization step, one $H_2SO_4$ leaching step and one hydrochlorinating step. Optionally, a conversion from aluminium chloride into alumina can be carried out when the desired final product is alumina.

Conversion of Aluminium Nitride

In the conversion of aluminium nitride in aluminium hydroxide, the aluminium dross residues were mixed with hot water at the boiling point for a period of 24 hours. About 1 kg of NOVAL was introduced in a reactor with about 2.5 liters of water. The mixture was kept under stirring at the aforesaid temperature. Water was added occasionally to keep the volume substantially constant.

During this step, the ammoniac so-produced was vented out the reactor. When the reaction was completed, the mixture was filtered to recover the solid fraction. The mass of this fraction was about 1300 g on a dry basis.

The so-obtained solid was added to the liquid fraction of the $H_2SO_4$ leaching step (digestion), which is the step that neutralizes this acid fraction.

Neutralization Step

The solid fraction previously obtained in the conversion of aluminium nitride was mixed with the filtrate obtained from the $H_2SO_4$ leaching step at a temperature of about 100° C. for a period of about 2 hours. This liquid fraction contained sulfuric acid and aluminium sulfate in solution. The solid fraction will react with the sulfuric acid contained in the solution to solubilize the aluminium hydroxide produced at the step of converting aluminium nitride into aluminium hydroxide. Then, when the reaction is completed, the mixture is filtered. The so-obtained solid (about 450 g) is kept to be treated at the $H_2SO_4$ leaching step of the process. The so-obtained liquid, which contains all the Al atoms, is diluted with water to obtain a total volume of about 21 liters to have a concentration in Al atoms of about 25 g/liter. This liquid (also called leachate) will be used in the hydrochlorination step of the process.

$H_2SO_4$ Leaching Step

The solid fraction coming from the neutralization step is mixed with about 3 liters of sulfuric acid 98% at a temperature of about 200° C. for about 2 hours. The mixture is under stirring during all this time in order to solubilize all the Al atoms. Then, when the leaching is completed, about 14 liters of water are added to the mixture to make sure that all the sulfates produced by the reaction are kept in solution. The mixture is stirred for about 2 hours at a temperature of about 100° C. in order to maximize the solubilization.

Then, when the mixture was back at room temperature, it was filtered under vacuum. The so-obtained liquid fraction was used in the neutralization step of the process to solubilize the aluminium hydroxide contained in the solid phase of the conversion step. The solid fraction, which is the solid residue of the process, has to be wasted.

Hydrochlorinating

The neutralization step liquid (about 21 liters) is cooled down to 0° C. Then it was treated with gaseous HCl and the reaction was carried out at a temperature of about −4° C. to 4° C. The hydrochlorination is carried out until the solution is saturated. The gaseous HCl thereby introduced causes aluminium chloride formation and precipitation. Then, the so-obtained cold mixture is filtered under vacuum so as to provide about 8 700 grams of aluminium chloride hydrate and about 24 liters of a waste liquid. This liquid could be further distillated to recover sulfuric acid and hydrochloridric acid.

Pyrohydrolysis of Aluminium Chloride Into Alumina

The aluminium chloride obtained in the hydrochlorinating step is then optionally converted into alumina by means of a pyrohydrolysis.

The aluminium chloride is heated at a temperature of about 500° C. for about 2 hours in order to convert the aluminium chloride into aluminium hydroxide and gaseous HCl. Then, the so-obtained material is washed with hot water at about 80° C. to remove chloride salt. The product is then heated for 15 minutes at about 1050° C. to convert aluminium hydroxide into gamma-alumina thereby providing about 990 g of alumina having a degree of purity of at least 98%. The 100% theoretical yield of conversion of all the Al atoms contained in the Noval should provide 995 g the Al atoms of the dross residues into alumina was 99.5%.

It was found that the processes described in the present document are quite simple and that they can be carried out at low costs. It was also found that such processes propose efficient ways to valorize aluminium dross residues by converting the Al atoms comprised therein into aluminium chloride. Such processes permit to recuperate, recover or extract very high yields of Al atoms from aluminium dross residues and convert them into aluminium chloride and optionally into alumina. It was found that by submitting aluminium dross residues with one leaching using $H_2SO_4$, it was possible to valorize a very high percentage of the total weight aluminium dross residues and convert it in aluminium chloride and eventually, if desired, into alumina.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A process for treating aluminium dross residues comprising:
   leaching aluminium dross residues, at a temperature of at least 200° C., with $H_2SO_4$ having a concentration of about 98% so as to obtain a mixture comprising a solid and a liquid, and separating said solid from said liquid;
   solubilizing in water at least a portion of minerals and metals contained in said solid so as to obtain a leachate;
   hydrochlorinating said leachate so as to obtain aluminium chloride; and
   converting said aluminium chloride into alumina,
   wherein in said process, at least 80% by weight of the Al atoms contained in the aluminium dross residues are converted into alumina.

2. The process of claim 1, wherein said leaching is carried out at a temperature of at least 225° C.

3. The process of claim 1, wherein said leaching is carried out at a temperature of about 275° C.

4. The process of claim 1, wherein said leaching step is carried out at a temperature of at least 250° C.

5. The process of claim 1, wherein the solid is treated with water having a temperature of at least 50° C. so as to solubilize metals and minerals contained therein and to obtain said leachate.

6. The process of claim 1, wherein the solid is treated with water having a temperature of at least 70° C. so as to solubilize metals and minerals contained therein and to obtain said leachate.

7. The process of claim 6, wherein said leachate is hydrochlorinated with gaseous HCl.

8. The process of claim 7, wherein said hydrochlorination is carried out at a temperature of about −10° C. to about 20° C.

9. The process of claim 2, wherein said hydrochlorination is carried out at a temperature of about −10° C. to about 0° C.

10. The process of claim 1, wherein in said process, at least 90% by weight of the Al atoms contained in the aluminium dross residues are converted into alumina.

11. The process of claim 8, wherein the aluminium chloride is converted into alumina at a temperature of about 950° C. to 1150° C.

12. A process for treating aluminium dross residues comprising:
   treating aluminium dross residues so as to reduce the amount of aluminium nitride present therein;
   leaching said aluminium dross residues having a reduced amount of aluminium nitride, at a temperature of at least 200° C., with $H_2SO_4$ having a concentration of about 98% so as to obtain a mixture comprising a solid and a liquid, and separating said solid from said liquid;
   solubilizing in water at least a portion of minerals and metals contained in said solid so as to obtain a leachate; and
   hydrochlorinating said leachate so as to obtain aluminium chloride; and
   converting said aluminium chloride into alumina,
   wherein in said process, at least 80% by weight of the Al atoms contained in the aluminium dross residues are converted into alumina.

13. The process of claim 12, wherein the amount of aluminium nitride is reduced by converting aluminium nitride into aluminium hydroxide.

14. The process of claim 13, wherein aluminium nitride is converted into aluminium hydroxide by reacting said aluminium dross residues with water having a temperature of at least 80° C.

15. The process of claim 13, wherein aluminium nitride is converted into aluminium hydroxide by reacting said aluminium dross residues with water being at temperature around its boiling point.

16. The process of claim 14, wherein at least 80% of the aluminium nitride present in the aluminium dross residues is converted into aluminium hydroxide.

17. The process of claim 12, wherein in said process, at least 95% by weight of the Al atoms contained in the aluminium dross residues are converted into alumina.

18. The process of claim 14, wherein the aluminium chloride is converted into alumina at a temperature of about 950° C. to 1150° C.

19. A process for treating aluminium dross residues comprising:
   treating aluminium dross residues so as to reduce the amount of aluminium nitride present therein by treating said aluminium dross residues with water having a temperature of at least 80° C. so as to obtain a first solid and a first liquid, and separating said first solid from said first liquid;
   pre-leaching said first solid with $H_2SO_4$ recovered from a $H_2SO_4$ leaching step so as to obtain a second solid and a second liquid, and separating said second solid from said second liquid;
   carrying out said $H_2SO_4$ leaching step by leaching said second solid at a temperature of at least 200° C., with $H_2SO_4$ having a concentration of about 98% so as to obtain a mixture and treating said mixture with water so as to solubilize at least a portion of minerals and metals contained in said mixture and carrying out a filtration so as to obtain a third liquid that comprises said $H_2SO_4$ recovered from a $H_2SO_4$ leaching step and;
   hydrochlorinating said second liquid so as to obtain aluminium chloride; and
   converting said aluminium chloride into alumina,
   wherein in said process, at least 80% by weight of the Al atoms contained in the aluminium dross residues are converted into alumina.

20. The process of claim 19, wherein said leaching is carried out at a temperature of at least 250° C.

21. The process of claim 19, wherein said leachate is hydrochlorinated with gaseous HCl.

22. The process of claim 21, wherein said hydrochlorination is carried out at a temperature of about −10° C. to about 20° C.

23. The process of claim 20, wherein the aluminium chloride is converted into alumina at a temperature of about 950° C. to 1150° C.

24. A process for preparing alumina comprising:
   optionally treating aluminium dross residues so as to reduce the amount of aluminium nitride present therein;
   leaching said aluminium dross residues optionally having a reduced amount of aluminium nitride, at a temperature of at least 200° C., with $H_2SO_4$ having a concentration of about 98% so as to obtain a mixture comprising a solid and a liquid, and separating said solid from said liquid;
   solubilizing in water at least a portion of minerals and metals contained in said solid so as to obtain a leachate;
   hydrochlorinating said leachate so as to obtain aluminium chloride; and
   converting said aluminium chloride into alumina, wherein in said process, at least 80% by weight of the Al atoms contained in the aluminium dross residues are converted into alumina.

25. The process of claim 24, wherein at least 90% by weight of the Al atoms contained in the aluminium dross residues are thereby obtained in the form of alumina.

26. The process of claim 25, wherein the alumina obtained has a purity of at least 90%.

27. The process of claim 24, wherein in said process, at least 95% by weight of the Al atoms contained in the aluminium dross residues are converted into alumina.

28. The process of claim 24, wherein the aluminium chloride is converted into alumina at a temperature of about 950° C. to 1150° C.

* * * * *